United States Patent [19]
Ichikawa

[11] Patent Number: 5,249,432
[45] Date of Patent: Oct. 5, 1993

[54] AIR CONDITIONING APPARATUS IN WHICH ONE OUTDOOR UNIT IS CONNECTED TO ONE OR A PLURALITY OF INDOOR UNITS

[75] Inventor: Yasunori Ichikawa, Fuji, Japan

[73] Assignee: Kabushiki Kaisha Toshiba, Kawasaki, Japan

[21] Appl. No.: 826,611

[22] Filed: Jan. 28, 1992

[30] Foreign Application Priority Data

Feb. 20, 1991 [JP] Japan ................................. 3-26431

[51] Int. Cl.$^5$ ............................................. F25B 41/00
[52] U.S. Cl. ........................................... 62/197; 62/201
[58] Field of Search ................ 62/201, 197, 117, 238, 62/7; 237/2 B

[56] References Cited

U.S. PATENT DOCUMENTS

| | | | |
|---|---|---|---|
| 3,435,627 | 4/1969 | Castillo | 62/197 |
| 4,148,436 | 4/1979 | Shaw | 237/2 B |
| 4,742,689 | 5/1988 | Lowes | 62/197 |

FOREIGN PATENT DOCUMENTS 54-685 1/1979 Japan .
64-6657 1/1989 Japan .

*Primary Examiner*—William E. Wayner
*Attorney, Agent, or Firm*—Cushman, Darby & Cushman

[57] ABSTRACT

A refrigerant discharged from a compressor is flowed to air heat exchangers, an expansion valve, and a water heat exchanger unit, and the refrigerant passing through the water heat exchanger unit is taken in by the compressor, thus executing a heating operation mode. The expansion valve has a heat-sensitive portion for sensing a temperature of the refrigerant taken in by the compressor. The opening degree of the expansion valve is changed in accordance with a difference between the temperature of the refrigerant flowing therein and a temperature sensed by the heat-sensitive portion. A bypass is provided for supplying part of the refrigerant passing through the air heat exchangers to the suction side of the compressor. The bypass is caused to communicate when a temperature of water supplied to the water heat exchanger unit is increased. By this communication, the low-temperature refrigerant then flows to the suction side of the compressor to cool the heat-sensitive portion of the expansion valve. An unnecessary increase in opening degree of the expansion valve is prevented.

6 Claims, 11 Drawing Sheets

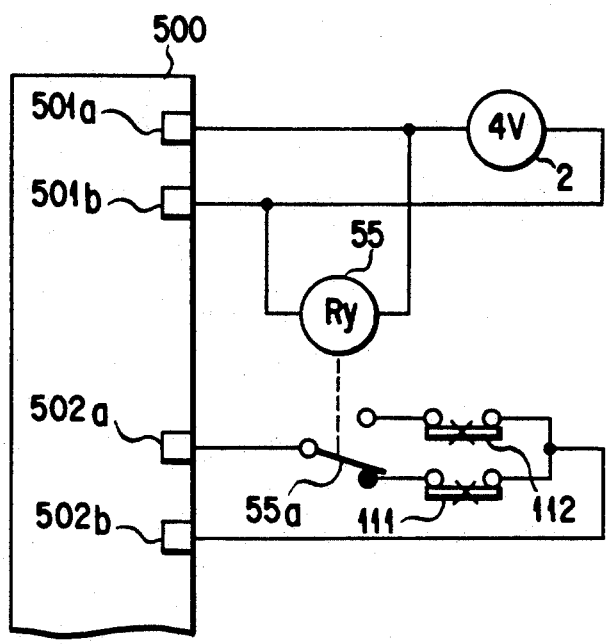
F I G. 5
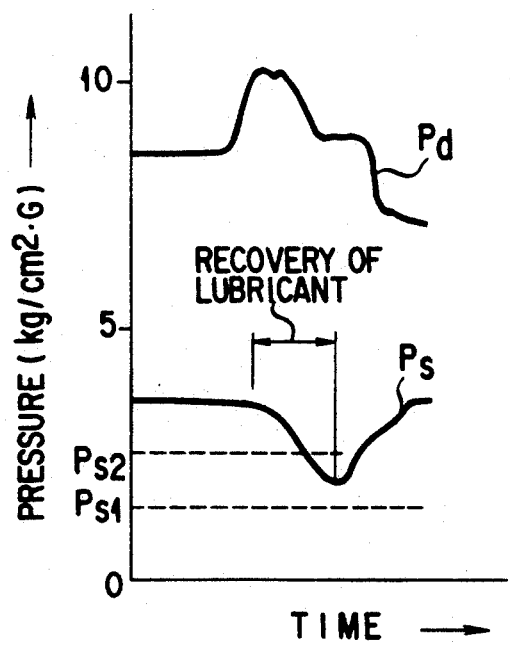
F I G. 12

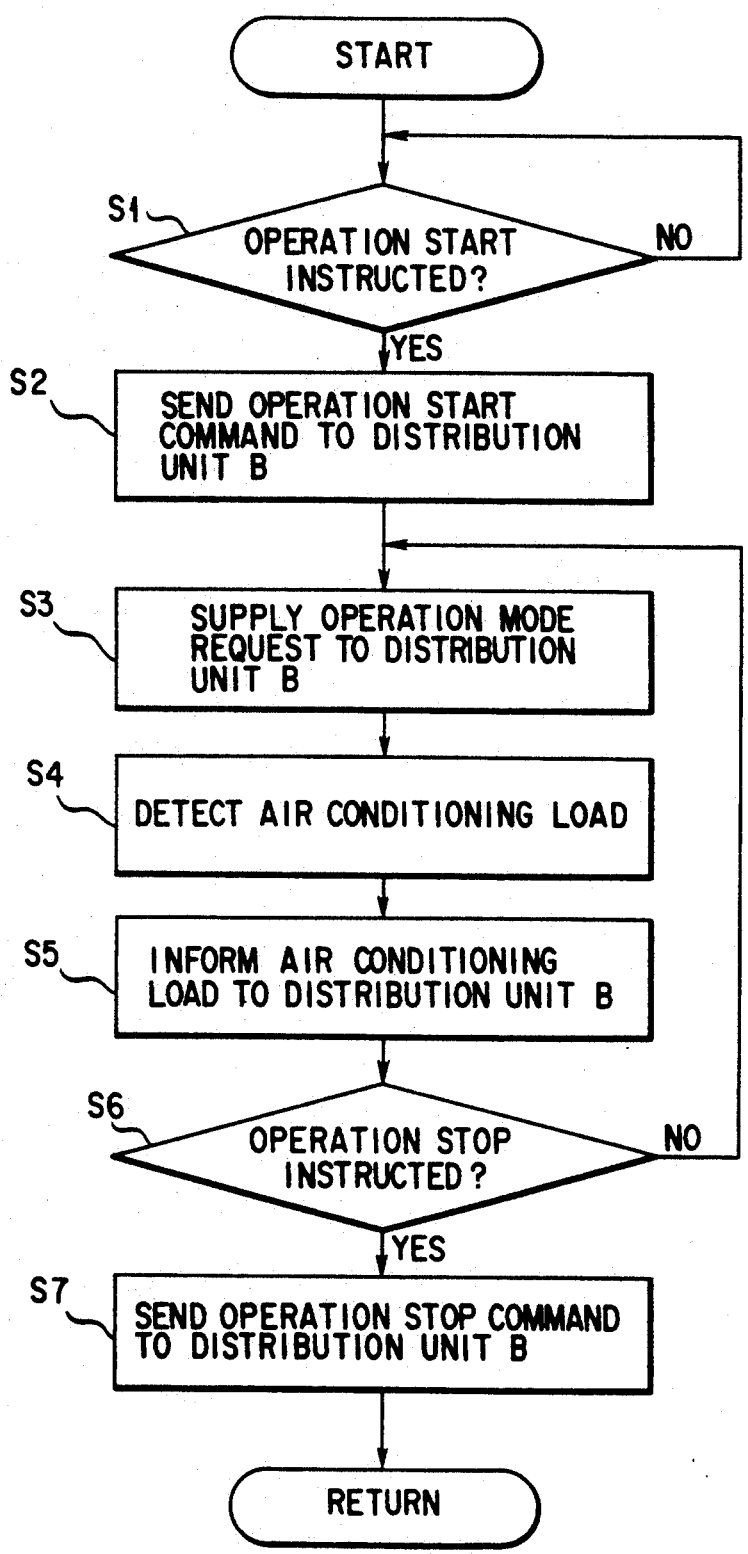
F I G. 6

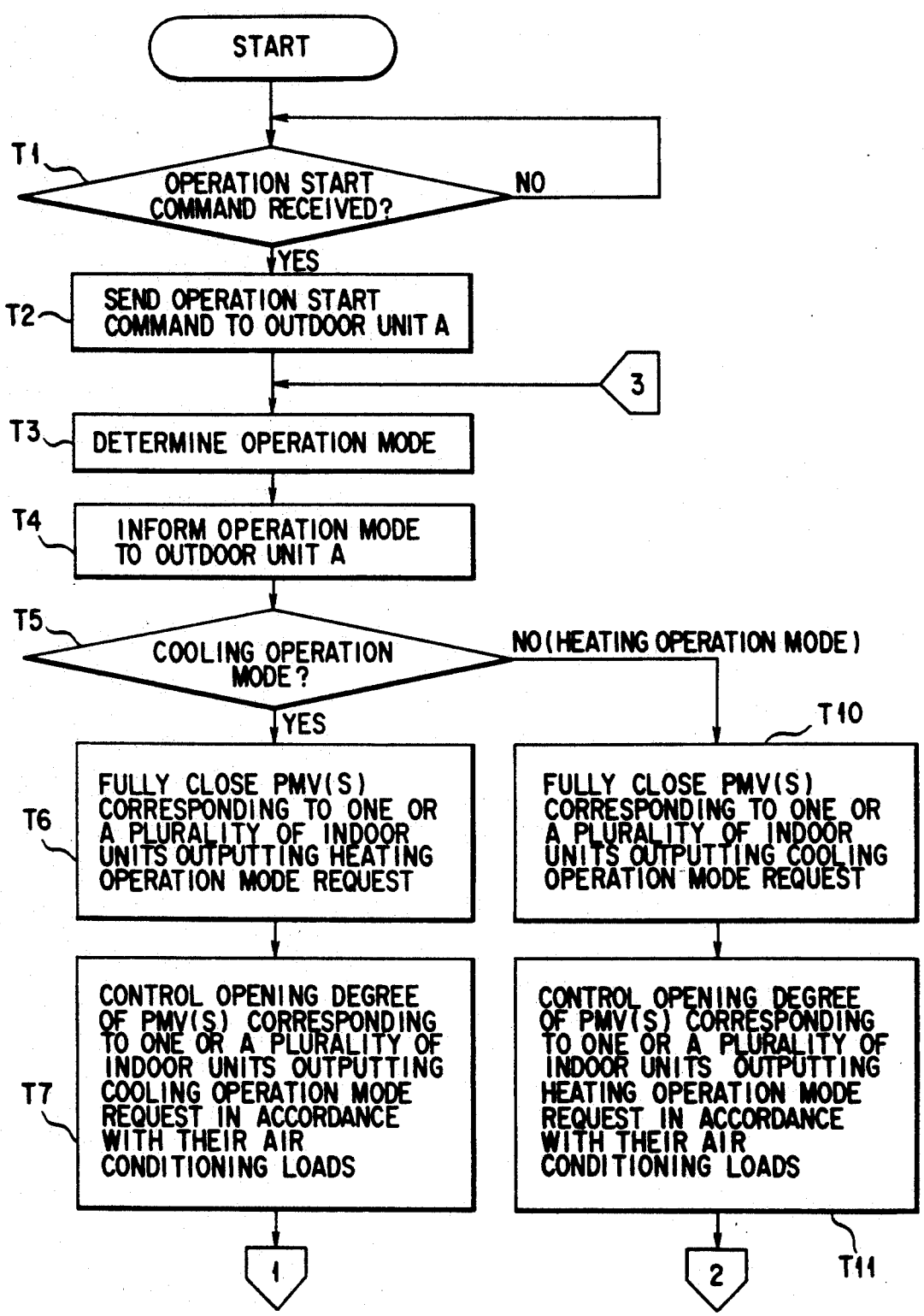
F I G. 7

AIR CONDITIONING APPARATUS IN WHICH ONE OUTDOOR UNIT IS CONNECTED TO ONE OR A PLURALITY OF INDOOR UNITS

BACKGROUND OF THE INVENTION

1. Field of the Invention

The present invention relates to an air conditioning apparatus having a water heat exchanger unit.

2. Description of the Related Art

An air conditioning apparatus has one outdoor unit and one or a plurality of indoor units. The outdoor unit has a compressor, a four-way valve, a water heat exchanger unit, and a expansion valve. Each indoor unit has an air heat exchanger.

In this air conditioning apparatus, the compressor, the four-way valve, the water heat exchanger unit, the expansion valve, and one or the plurality of air heat exchangers are connected via pipes, thus constituting a heat pump type refrigeration cycle.

When the compressor is operated and the four-way valve is set in the neutral state, the refrigerant discharged from the compressor flows to the water heat exchanger unit via the four-way valve, and the refrigerant output from the water heat exchanger unit returns to the compressor via the expansion valve, one or the plurality of air heat exchangers, and the four-way valve. That is, the water heat exchanger unit serves as a condenser, and one or the plurality of air heat exchangers serve as evaporators, thus executing a cooling operation mode.

When the compressor is operated and the four-way valve is switched, the refrigerant discharged from the compressor flows to one or the plurality of air heat exchangers via the four-way valve, and the refrigerant output from one or the plurality of air heat exchangers returns to the compressor via the expansion valve, the water heat exchanger unit, and the four-way valve. That is, one or the plurality of air heat exchangers serve as condensers, and the water heat exchanger unit serves as an evaporator, thus executing a heating operation mode.

The water heat exchanger unit exchanges heat of the refrigerant flowing therein for heat of water supplied by an external water supply unit. The air-conditioning capability is increased by this water heat exchanger unit.

The expansion valve include cooling and heating expansion valves. A heating expansion valve for the heating operation mode has a heat-sensitive portion for sensing a temperature of the refrigerant taken into the compressor. The opening degree of the heating expansion valve is automatically changed in accordance with a difference between the temperature of the refrigerant flowing into the heating expansion valve and the temperature sensed by the heat-sensitive portion.

A super-heat degree of the refrigerant in the water heat exchanger unit is kept at a predetermined value by the change in opening degree of the expansion valve. This is to maintain a stable operation of the components constituting the refrigeration cycle.

When the temperature of water supplied to the water heat exchanger unit is increased, the temperature of the refrigerant flowing from the water heat exchanger unit is increased. Then, the heat-sensitive portion of the expansion valve is heated.

When the heat-sensitive portion of the expansion valve is heated, the opening degree of the expansion valve is increased to increase the flow rate of the refrigerant, thus increasing a low-pressure-side pressure of the refrigeration cycle. Then, a high-pressureside pressure is also increased accordingly.

When the high-pressure-side pressure is excessively increased, the lifetime of the components constituting the refrigeration cycle is adversely affected.

A lubricant for smoothing motion of the components is filled in the compressor. Part of the lubricant flows into the refrigeration cycle together with the discharged refrigerant, but is returned to the compressor together with the refrigerant.

In an air conditioning apparatus having a plurality of indoor units, however, the capability of the compressor is controlled in accordance with the sum of the air conditioning loads of the indoor units. Therefore, when the number of operating indoor units is small, the circulating amount of refrigerant is decreased.

When the circulating amount of refrigerant is decreased, the amount of lubricant returning to the compressor is decreased, thus adversely affecting the lifetime of the compressor.

For this reason, conventionally, an operation for increasing the capability of the compressor is periodically executed during the cooling operation mode. That is, when the capability of the compressor is increased, the circulating amount of refrigerant is increased, so that the lubricant in the refrigeration cycle is forcibly recovered to the compressor.

During recovery, however, as the flow rate of refrigerant is increased, the vapor pressure of the refrigerant in the water heat exchanger unit is decreased. Then, the low-pressure-side pressure of the refrigeration cycle is decreased, and a pressure switch connected to the low-pressure-side pipe is sometimes operated.

The pressure switch is provided for protecting the low-pressure-side pipe against an abnormal pressure drop and for preventing freezing of the water heat exchanger unit during the heating operation mode. When the pressure switch is turned on, operation of the compressor is stopped.

Then, the cooling operation is sometimes unnecessarily stopped.

Published Unexamined Japanese Patent Application No. 64-6657 discloses an air conditioning apparatus having a plurality of indoor units.

In this air conditioning apparatus, one outdoor unit has a plurality of air heat exchangers 3 and 4, and a plurality of indoor units 8 and 9 have air heat exchangers 11a and 11b, respectively. A flow of the refrigerant into the air heat exchangers 3 and 4 is controlled in accordance with the number of operating indoor units.

This air conditioning apparatus, however, has no water heat exchanger unit.

Published Examined Japanese Utility Model Application No. 54-685 discloses an air conditioning apparatus having a plurality of indoor units and a water heat exchanger unit.

This air conditioning apparatus, however, has no control concerning the super-heat degree of the refrigerant in a water heat exchanger unit 3 and not control concerning recovery of the lubricant.

SUMMARY OF THE INVENTION

It is a primary object of the present invention to provide an air conditioning apparatus in which the opening degree of an expansion valve is maintained at an optimum state even if the temperature of water supplied to a water heat exchanger unit is increased, so that low- and high-pressure-side pressures of a refrigeration cycle can be maintained in optimum states, thus ensuring safety of the components constituting the refrigeration cycle.

According to the present invention, there is provided an air conditioning apparatus in which one outdoor unit is connected to one or a plurality of indoor units, comprising:

a compressor, provided to the outdoor unit, for taking in, compressing, and discharging a refrigerant;

a water heat exchanger unit, provided to the outdoor unit, for exchanging heat of the refrigerant flowing therein for heat of water supplied thereto;

a water supply unit for supplying water to the water heat exchanger unit;

an expansion valve, provided to the outdoor unit and having a heat-sensitive portion for sensing a temperature of the refrigerant flowing in the compressor, for maintaining at a predetermined value a super-heat degree of the refrigerant in the water heat exchange unit by changing an opening degree thereof in accordance with a difference between a temperature of the refrigerant flowing therein and the temperature sensed by the heat-sensitive portion;

one or a plurality of air heat exchangers, provided to the one or plurality of indoor units, for exchanging heat of the refrigerant flowing therein for heat of indoor air;

means for flowing the refrigerant discharged from the compressor to the one or plurality of air heat exchangers, flowing the refrigerant passing through the one or plurality of air heat exchangers to the water heat exchanger unit via the expansion valve, and returning the refrigerant passing through the water heat exchanger unit to the compressor, thereby executing a heating operation mode;

a bypass for supplying part of the refrigerant passing through the one or plurality of air heat exchangers to a suction side of the compressor;

a two-way valve provided to the bypass;

detecting means for detecting a temperature of water after heat-exchanged by the water heat exchanger unit; and control means for opening the two-way valve when the temperature detected by the detecting means is not less than a preset value in the heating operation mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a circuit diagram showing the arrangement of the main part of an outdoor controller of the embodiment shown in FIG. 1;

FIG. 6 is a flow chart for explaining the operation of an indoor controller of the embodiment shown in FIG. 1;

FIGS. 7 and 8 are flow charts for explaining the operation of a distribution controller of the embodiment shown in FIG. 1;

FIG. 12 is a graph showing changes in high- and low pressure-side pressures of the embodiment of FIG. 1 during the cooling operation mode;

DETAILED DESCRIPTION OF THE PREFERRED EMBODIMENT

The preferred embodiment of the present invention will be described with reference to the accompanying drawings.

Figure 1:
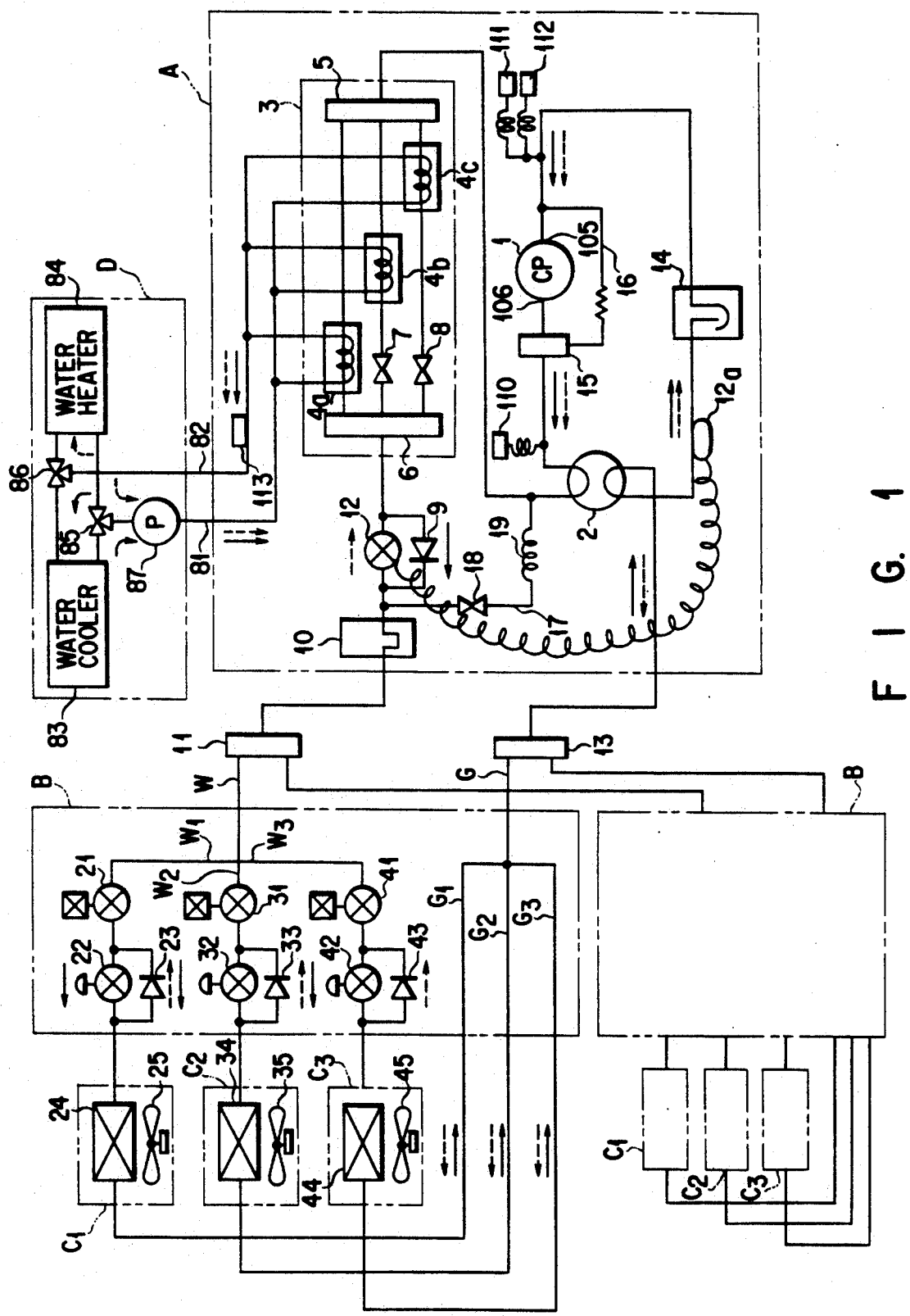
FIG. 1 is a block diagram showing the arrangement of the refrigeration cycle according to an embodiment of the present invention.

As shown in FIG. 1, an outdoor unit A is connected to a distribution unit B. The distribution unit B is connected to a plurality of indoor units $C_1$, $C_2$, and $C_3$.

These units A, B, $C_1$, $C_2$, and $C_3$ constitute the following heat pump type refrigeration cycle.

Figure 2:
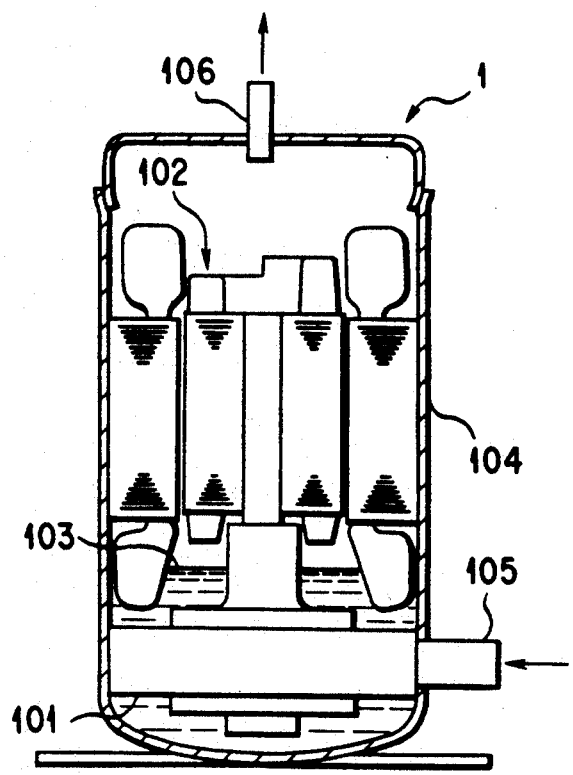
FIG. 2 is a sectional view showing the interior of a compressor of the embodiment shown in FIG. 1.

The outdoor unit A has a variable-capability compressor 1. In the compressor 1, a compressor portion 101 and a motor portion 102 are sealed in a case 104 together with a lubricant 103, as shown in FIG. 2.

A suction port 105 for taking in a refrigerant is formed in a bottom portion of the case 104, and the suction port 105 communicates with the compressor portion 101. A discharge port 106 for discharging the refrigerant is formed in an upper portion of the case 104.

The motor portion 102 drives the compressor portion 101. The compressor portion 101 takes in the refrigerant through the suction port 105, compresses it, and discharges it into the case 104. The refrigerant discharged into the case 104 is directly discharged to the outside through the discharge port 106.

The lubricant 103 has a function of smoothing the motion of the compressor portion 101 and the motor portion 102 and a function of cooling them.

The discharge port 106 of the compressor 1 is connected to a water heat exchanger unit 3 via a solenoid four-way valve 2. The four-way valve 2 selects the flow direction of the refrigerant. When the four-way valve 2 is not energized, it is set in the neutral state; when energized, it is switched.

In the water heat exchanger unit 3, a plurality of water heat exchangers $4_a$, $4_b$, and $4_c$ are connected in parallel to each other via headers 5 and 6, and solenoid two-way valves 7 and 8 are connected to, of pipes connected to the water heat exchangers $4_b$ and $4_c$, those corresponding to a check valve 9 and an expansion valve 12 to be described later.

The water heat exchangers $4_a$, $4_b$, and $4_c$ exchange heat of the refrigerant flowing therein for heat of water supplied from a water supply unit D to be described later.

Figure 3:
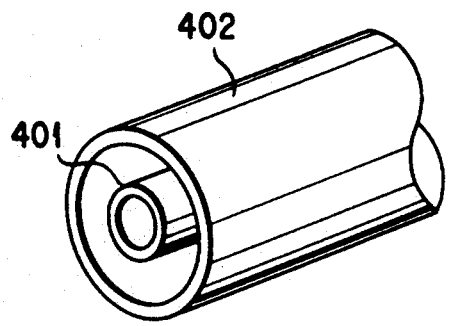
FIG. 3 is a perspective view showing inner and outer pipes of a water heat exchanger of the embodiment shown in FIG. 1.

Each of the water heat exchangers $4_a$, $4_b$, and $4_c$ has a double pipe structure in which inner and outer pipes 401 and 402 are concentrically arranged, as shown in FIG. 3. Water flows in the inner pipe 401, and the refrigerant flows between the inner and outer pipes 401 and 402. Since each of the water heat exchangers $4_a$, $4_b$, and $4_c$ has the double pipe structure, efficient heat exchange between the refrigerant and water can be performed.

The water heat exchanger unit 3 is connected to a receiver 10 via a forward-direction check valve 9. The receiver 10 is connected to a header 11.

The expansion valve 12 for the heating operation mode is connected in parallel to the check valve 9. Expansion valve 12 is a standard thermostatic expansion valve which operates to maintain a constant superheat.

The expansion valve 12 has a heat-sensitive portion 12a for sensing the temperature of the refrigerant. The opening degree of the expansion valve 12 is automatically changed in accordance with a difference between the temperature of the received refrigerant and the temperature sensed by the heat-sensitive portion 12a. The heat-sensitive portion 12a is connected to a low-pressure-side pipe between the four-way valve 2 and an accumulator 14 to be described later.

That is, the opening degree of the expansion valve 12 is changed in accordance with a difference in temperature between the refrigerant flowing therein and the refrigerant taken in by the compressor 1.

The header 11 is connected to a liquid-side pipe W. The liquid-side pipe W branches into three liquid-side pipes $W_1$, $W_2$, and $W_3$.

The liquid-side pipes $W_1$, $W_2$, and $W_3$ are connected to air heat exchangers 24, 34, and 44 of the indoor units $C_1$, $C_2$, and $C_3$ via flow control valves 21, 31, and 41 and cooling expansion valves 22, 32, and 42, respectively.

Pulse motor valves, each opening degree of which is changed in accordance with the number of supplied drive pulses, are used as the flow control valves 21, 31, and 41, respectively. The flow control valves will be referred to as PMVs hereinafter.

The air heat exchangers 24, 34, and 44 exchange the heat of the refrigerant flowing therein for the heat of indoor air.

Check valves 23, 33, and 43 are connected in parallel to the expansion valves 22, 32, and 42, respectively.

The air heat exchangers 24, 34, and 44 are connected to gas-side pipes $G_1$, $G_2$, and $G_3$, respectively.

The gas-side pipes $G_1$, $G_2$, and $G_3$ are coupled to a gas-side pipe G.

The gas-side pipe G is coupled to a header 13. The header 13 is connected to the suction port 105 of the compressor 1 via the four-way valve 2 and the accumulator 14.

An oil separator 15 is connected to a high-pressure-side pipe between the discharge port 106 of the compressor 1 and the four-way valve 2. A bypass 16 is provided between the oil separator 15 and the suction port 105 of the compressor 1.

One end of a bypass 17 is connected to a pipe between the receiver 10 and the expansion valve 12. The other end of the bypass 17 is connected to a pipe between the four-way valve 2 and the water heat exchanger unit 3.

A two-way valve 18 and a capillary tube 19 are connected to the bypass 17.

A pressure sensor 110 is connected to a high-pressure side pipe between the oil separator 15 and the four-way valve 2. The pressure sensor 110 detects a high-pressure-side pressure $P_d$.

First and second pressure switches 111 and 112 are connected to a low-pressure-side pipe between the accumulator 14 and the suction port 105 of the compressor 1.

The first pressure switch 111 is for the heating operation mode and is turned on when the suction-side pressure of the compressor 1, i.e., a low-pressure-side pressure $P_s$ becomes a preset value $P_{s1}$ or less. Once turned on, the pressure switch 111 can be turned off only by a manual operation.

The second pressure switch 112 is for the cooling operation mode and is turned on when the suction-side pressure of the compressor 1, i.e., the low-pressureside pressure $P_s$ becomes a preset value $P_{s2}$ ($>P_{s1}$) or less. Once turned on, the pressure switch 112 can be turned off only by a manual operation.

The water supply unit D is connected to the outdoor unit A via water pipes 81 and 82.

The water supply unit D has a water cooler 83 for supplying cold water, a water heater 84 for supplying hot water, solenoid three-way valves 85 and 86, and a pump 87. Each of the three-way valves 85 and 86 has two channels. In the deenergized neutral state, one channel is open and the other channel is closed; when energized, the former is closed and the latter is open.

For example, a cooling tower is used as the water cooler 83, and a heater utilizing midnight power is used as the water heater 84.

The water outlet port of the water cooler 83 is connected to the water intake port of the pump 87 via one channel of the three-way valve 85.

The water outlet port of the water heater 84 is connected to the water intake port of the pump 87 via the other channel of the three-way valve 85.

The water outlet port of the pump 87 is connected to the water pipe 81.

The water pipe 81 is connected to one end of the inner pipe 401 of each of the water heat exchangers $4_a$, $4_b$, and $4_c$.

The other end of each inner pipe 401 is connected to the water pipe 82.

The water pipe 82 is connected to the water intake port of the water cooler 83 via one channel of the three-way valve 86, and also to the water intake port of the water heater 84 via the other channel of the three-way valve 86.

A temperature sensor 113 is connected to the water pipe 82. The temperature sensor 113 detects the temperature of water flowing out from the water heat exchanger unit 3.

Figure 4:
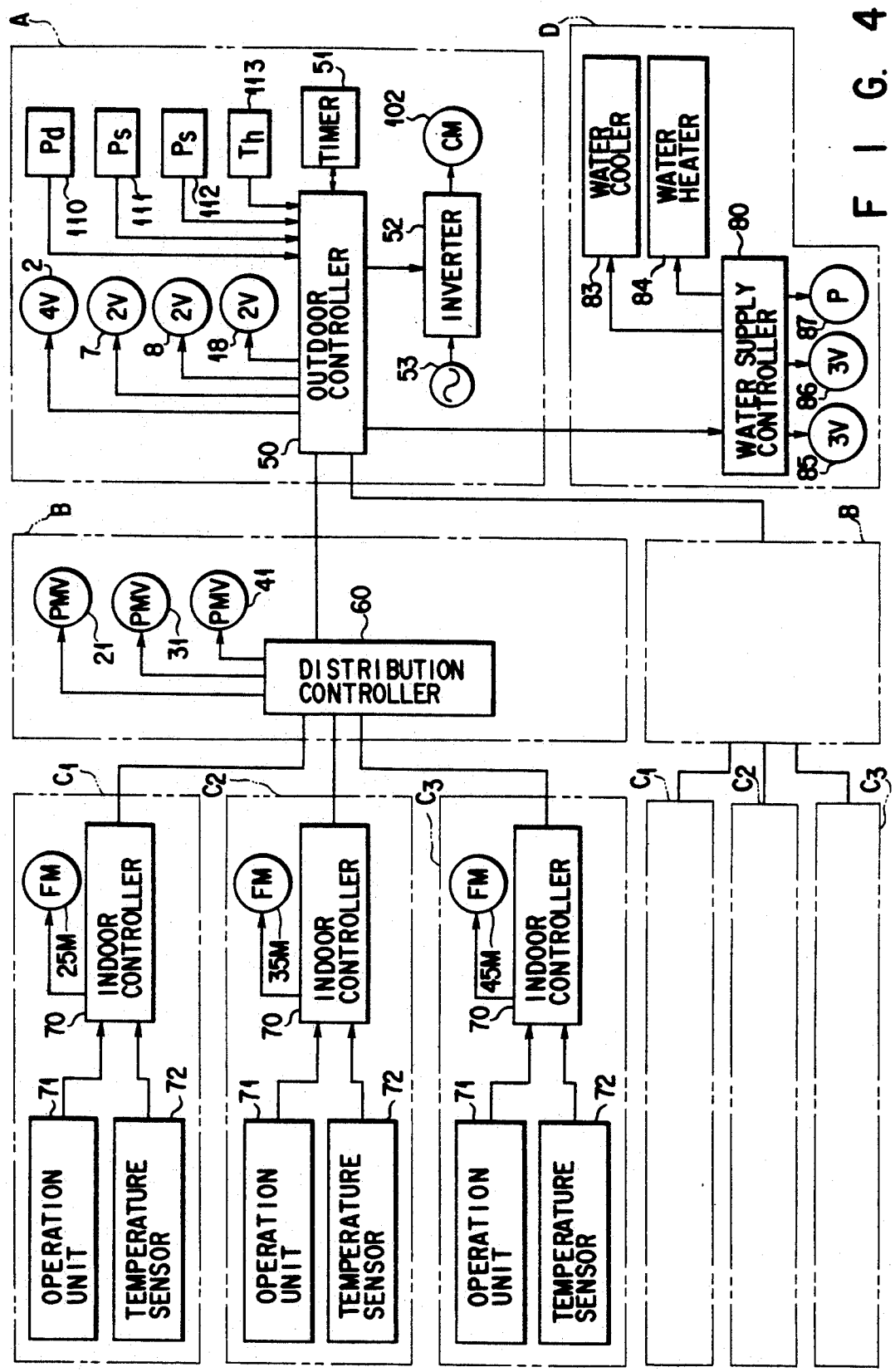
FIG. 4 is a block diagram showing the arrangement of a control circuit of the embodiment shown in FIG. 1.

FIG. 4 shows the control circuit.

The outdoor unit A has an outdoor controller 50 comprising a microcomputer and its peripheral circuits.

The outdoor controller 50 is connected to the four-way valve 2, the two-way valves 7, 8, and 18, the pressure sensor 110, the pressure switches 111 and 112, the temperature sensor 113, a timer 51, and an inverter 52.

The inverter 52 rectifies the voltage of a commercial AC power supply 53 to convert it to a voltage having a frequency and a level designated by a command from the outdoor controller 50, and outputs the converted voltage. The output from the inverter 52 is supplied to the motor portion 102 of the compressor 1 as the drive power.

FIG. 5 shows the main part of the outdoor controller 50.

The outdoor controller 50 has a circuit board 500 on which the microcomputer and its peripheral circuits are mounted. The circuit board 500 has terminals 501$_a$ and 501$_b$ to be connected to the four-way valve 2. A relay 55 is connected to the terminals 501$_a$ and 501$_b$. The relay 55 has a bidirectional contact 55$_a$.

The circuit board 500 also has terminals 502$a$ and 502$b$ to be connected to the pressure switches 111 and 112. The pressure switch 112 is connected to the terminals 502$a$ and 502$b$ via the normally open side of the contact 55$_a$. The pressure switch 111 is connected to the terminals 502$a$ and 502$b$ via the normally closed side of the contact 55$_a$.

That is, when the four-way valve 2 is not energized, the relay 55 is deenergized, and thus the normally closed side of the contact 55$_a$ is closed. Therefore, the pressure switch 111 for the cooling operation mode is connected to the terminals 502$a$ and 502$b$.

When the four-way valve is energized, the relay 55 is energized, and thus the normally open side of the contact 55$_a$ is closed. Therefore, the pressure switch 112 for the heating operation mode is connected to the terminals 502$a$ and 502$b$.

Referring back to FIG. 4, the outdoor controller 50 is connected to a distribution controller 60 of the distribution unit B via a signal line. The distribution controller 60 comprises a microcomputer and its peripheral circuits.

The distribution controller 60 is connected to the PMVs 21, 31, and 41.

The distribution controller 60 is also connected to indoor controllers 70 for the indoor units C$_1$, C$_2$, and C$_3$ via corresponding signal lines. Each indoor controller 70 comprises a microcomputer and its peripheral circuits.

Each indoor controller 70 is connected to a corresponding operation unit 71 and a corresponding temperature sensor 72. The temperature sensor 72 detects an indoor temperature.

The outdoor controller 50 is connected to a water supply controller 80 for the water supply unit D via a signal line. The water supply controller 80 comprises a microcomputer and its peripheral circuits.

The water supply controller 80 is connected to the water cooler 83, the water heater 84, the three-way valves 85 and 86, and the pump 87.

The indoor controller 70 of each of the indoor units C$_1$, C$_2$, and C$_3$ has the following functional means [1], [2], [3], and [4]:

[1] A means for sending an operation start or stop command based on an operation by the operation unit 71 to the distribution unit B.

[2] A means for sending a cooling or heating operation mode request set by the operation unit 71 to the distribution unit B.

[3] A means for calculating a difference between a preset indoor temperature set by the operation unit 71 and a temperature detected by the temperature sensor 72 as an air conditioning load.

[4] A means for informing the obtained air conditioning load to the distribution unit B.

The distribution controller 60 has the following functional means [1] to [9]:

[1] A means for determining either cooling or heating operation mode in accordance with the requests from the indoor units C$_1$, C$_2$, and C$_3$.

[2] A means for informing the determined operation mode to the outdoor controller 50.

[3] A means for fully closing, of the PMVs 21, 31, and 41, one corresponding to an indoor unit outputting the heating operation mode request when the cooling operation mode is determined.

[4] A means for controlling the opening degrees of, of the PMVs 21, 31, and 41, those corresponding to the indoor units outputting the cooling operation mode request when the cooling operation mode is determined.

[5] A means for calculating the sum of the air conditioning loads of the indoor units outputting the cooling operation mode request when the cooling operation mode is determined.

[6] A means for fully closing, of the PMVs 21, 31, and 41, one corresponding to an indoor unit outputting the cooling operation mode request when the heating operation mode is determined.

[7] A means for controlling the opening degrees of, of the PMVs 21, 31, and 41, those corresponding to the indoor units outputting the heating operation mode request in accordance with the air conditioning loads of these indoor units when the heating operation mode is determined.

[8] A means for calculating the sum of the air conditioning loads of the indoor units outputting the heating operation mode request when the heating operation mode is determined.

[9] A means for informing the obtained sum of the air conditioning loads to the outdoor unit A.

The outdoor controller 50 has the following functional means [1] to [13]:

[1] A means, responsive to the operation start command, for driving the inverter 52 and starting operation of the compressor 1.

[2] A means for controlling a frequency F (Hz) of the output voltage of the inverter 52 in accordance with the sum of the air conditioning loads.

[3] A means for not energizing the four-way valve 2 but setting it in the neutral state upon reception of the determination of the cooling operation mode.

[4] A means for operating the water cooler 83 of the water supply unit D, setting the three-way valves 85 and 86 in the neutral state, and operating the pump 87 upon reception of the determination of the cooling operation mode.

[5] A means for energizing the four-way valve 2 to switch it upon reception of the determination of the heating operation mode.

[6] A means for operating the water heater 84 of the water supply unit D, switching the three-way valves 85 and 86, and operating the pump 87 upon reception of the determination of the heating operation mode.

[7] A means for controlling opening/closing of the two-way valves 7 and 8 of the water heat exchanger unit 3 in accordance with the detection pressure P$_d$ (=high-pressure-side pressure) of the pressure sensor 110 in the cooling and heating operation modes.

[8] A means for periodically increasing the capability of the compressor 1 during the cooling operation mode. This is control for causing the compressor 1 to recover the lubricant 103 in the refrigeration cycle circulated from the compressor 1.

[9] A cooling protection means for stopping operation of the compressor 1 during ON time of the first pressure switch 111 in the cooling operation mode.

[10] A heating protection means for stopping operation of the compressor 1 during ON time of the second pressure switch 112 in the heating operation mode.

[11] A means for opening the two-way valve 18 when a detection temperature $T_h$ of the temperature sensor 113 is increased to a preset value of 28° C. or more in the heating operation mode, and thereafter closing the two-way valve 18 when the detection temperature $T_h$ of the temperature sensor 113 is decreased to a preset value of 23° C. or less.

[12] A means, responsive to the operation stop command, for stopping drive of the inverter 52 and stopping operation of the compressor 1.

[13] A means, responsive to the operation stop command, for stopping operation of the water supply unit D.

The operation of the air conditioning apparatus having the above structure will be described.

The operation of the indoor units $C_1$, $C_2$, and $C_3$ will be described first with reference to FIG. 6.

When an operation start is instructed by an operation unit 71 (step S1), an operation start command is sent to the distribution unit B (step S2).

At the same time, a cooling or heating operation mode request set by the operation unit 71 is supplied to the distribution unit B (step S3).

A difference between a preset indoor temperature set by the operation unit 71 and a temperature detected by the corresponding temperature sensor 72 is calculated as an air conditioning load (step S4). The obtained air conditioning load is informed to the distribution unit B (step S5).

When an operation stop is instructed by the operation unit 71 (Y in step S6), an operation stop command is sent to the distribution unit B (step S7).

Figure 8:
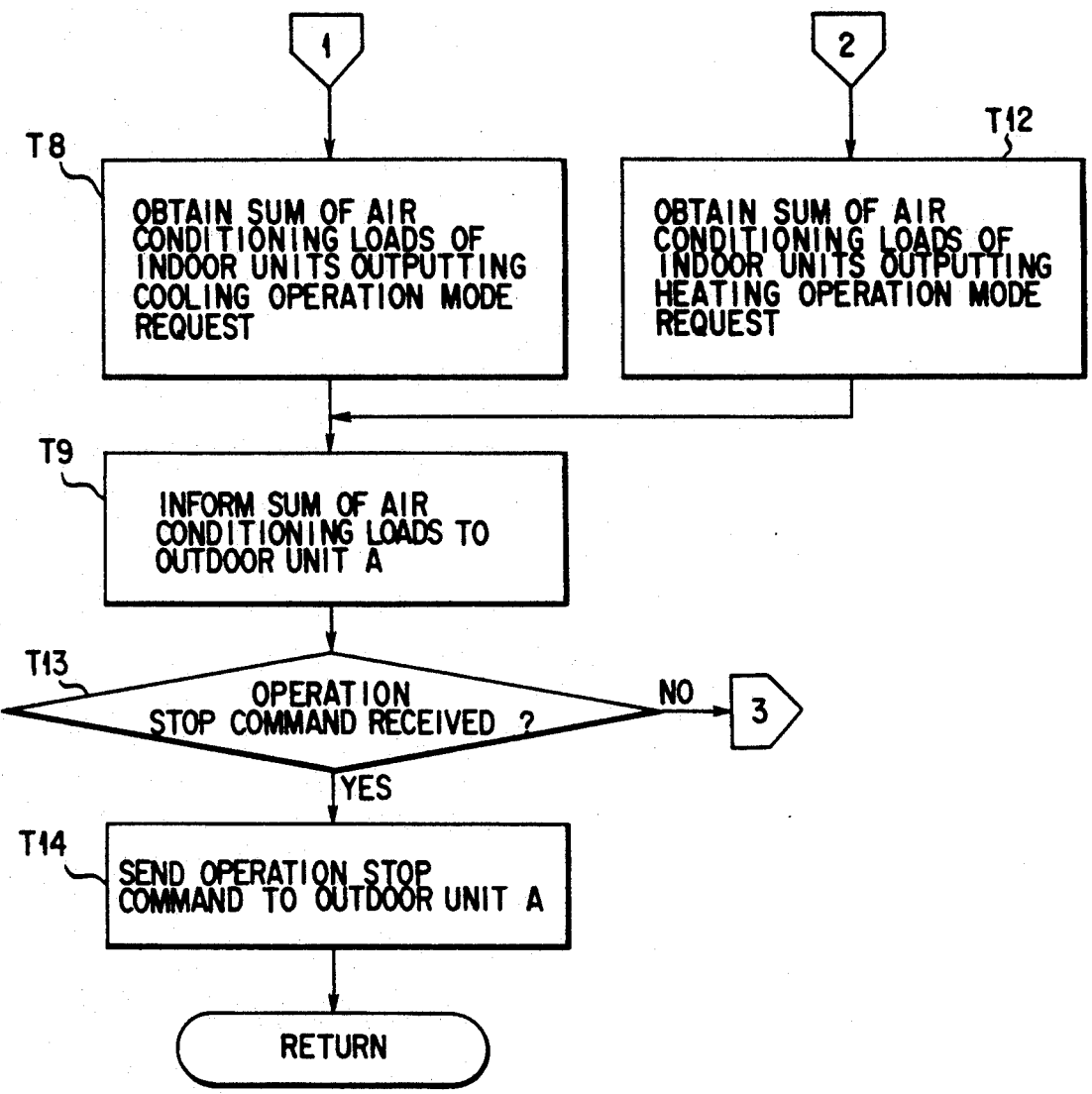

The operation of the distribution unit B will be described with reference to FIGS. 7 and 8.

When an operation start command is supplied by at lest one of the indoor units $C_1$, $C_2$, and $C_3$ (Y in step T1), the operation start command is sent to the outdoor unit A (step T2). At the same time, either the cooling or heating operation mode is determined in accordance with the requests from the indoor units $C_1$, $C_2$, and $C_3$ (step T3).

For example, the number of cooling operation mode requests and the number of heating operation mode requests are compared, and the operation mode with a larger number of requests is determined.

Alternatively, the indoor units $C_1$, $C_2$, and $C_3$ have a predetermined priority. The operation mode output by a highest-priority indoor unit, of the indoor units which output the operation mode requests, is selected and determined.

The determined operation mode is informed to the outdoor controller 50 (step T4).

When the cooling operation mode is determined (Y in step T5), one of the PMVs 21, 31, and 41 which corresponds to an indoor unit outputting the heating operation mode request is fully closed (step T6).

At the same time, the opening degrees of those of the PMVs 21, 31, and 41 which correspond to the indoor units outputting the cooling operation mode requests are controlled in accordance with the air conditioning loads of these indoor units (step T7).

The sum of the air conditioning loads of the indoor units which output the cooling operation mode requests is obtained (step T8). The obtained sum of the air conditioning loads is informed to the outdoor unit A (step T9).

When the heating operation mode is determined (N in step T5), one of the PMVs 21, 31 and 41 which corresponds to an indoor unit outputting the cooling operation mode request is fully closed (step T10).

At the same time, the opening degrees of those of the PMVs 21, 31, and 41 which correspond to the indoor units outputting the heating operation mode requests are controlled in accordance with the air conditioning loads of these indoor units (step T11).

The sum of the air conditioning loads of the indoor units outputting the heating operation mode requests is obtained (step T12). The obtained sum of the air conditioning loads is informed to the outdoor unit A (step T9).

When operation stop commands are supplied from all of the indoor units $C_1$, $C_2$, and $C_3$ (Y in step T13), the operation stop command is instructed to the outdoor unit A (step T14).

Figure 9:
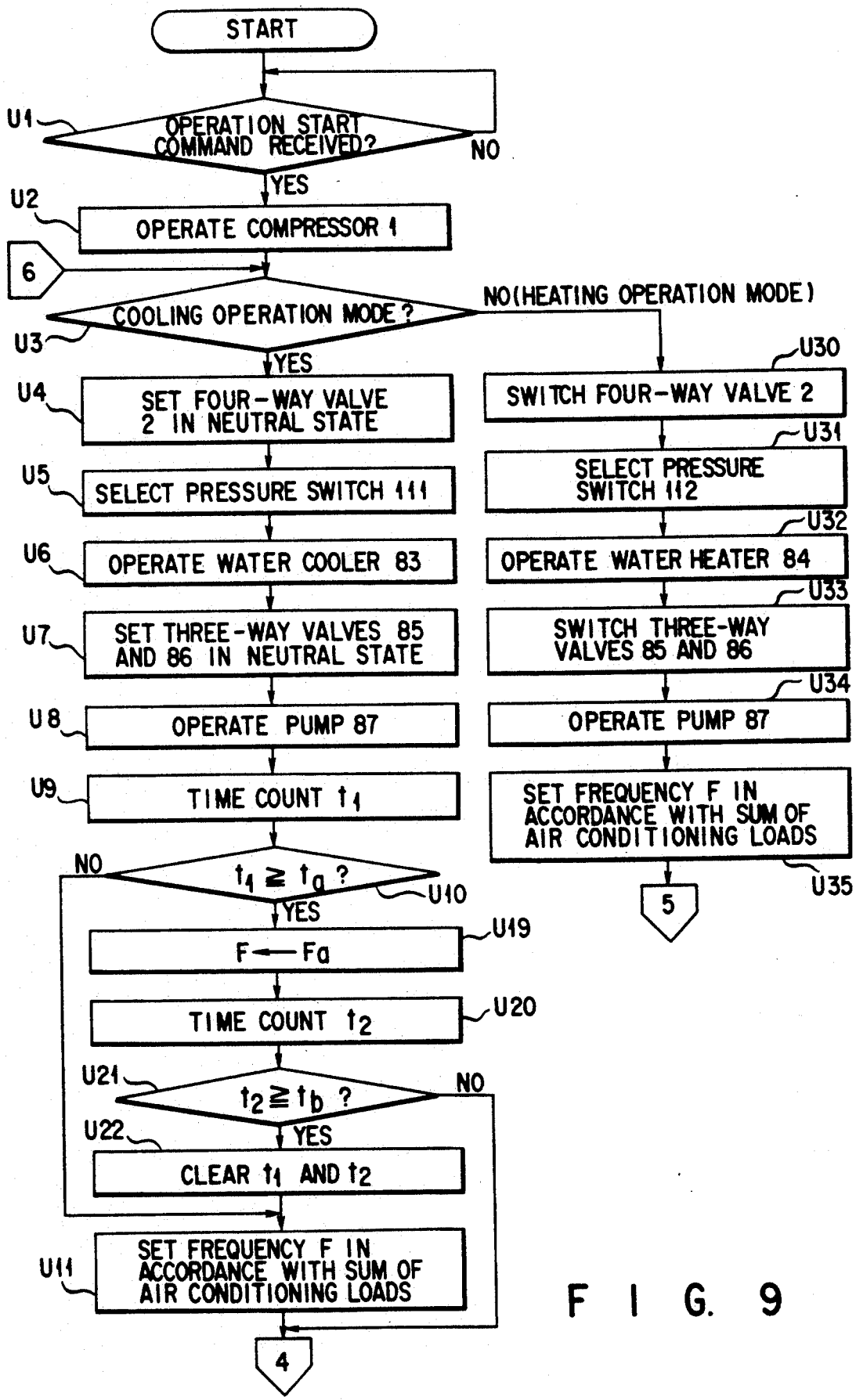
FIGS. 9, 10, and 11 are flow charts for explaining the operation of the outdoor controller of the embodiment shown in FIG. 1.
Figure 10:
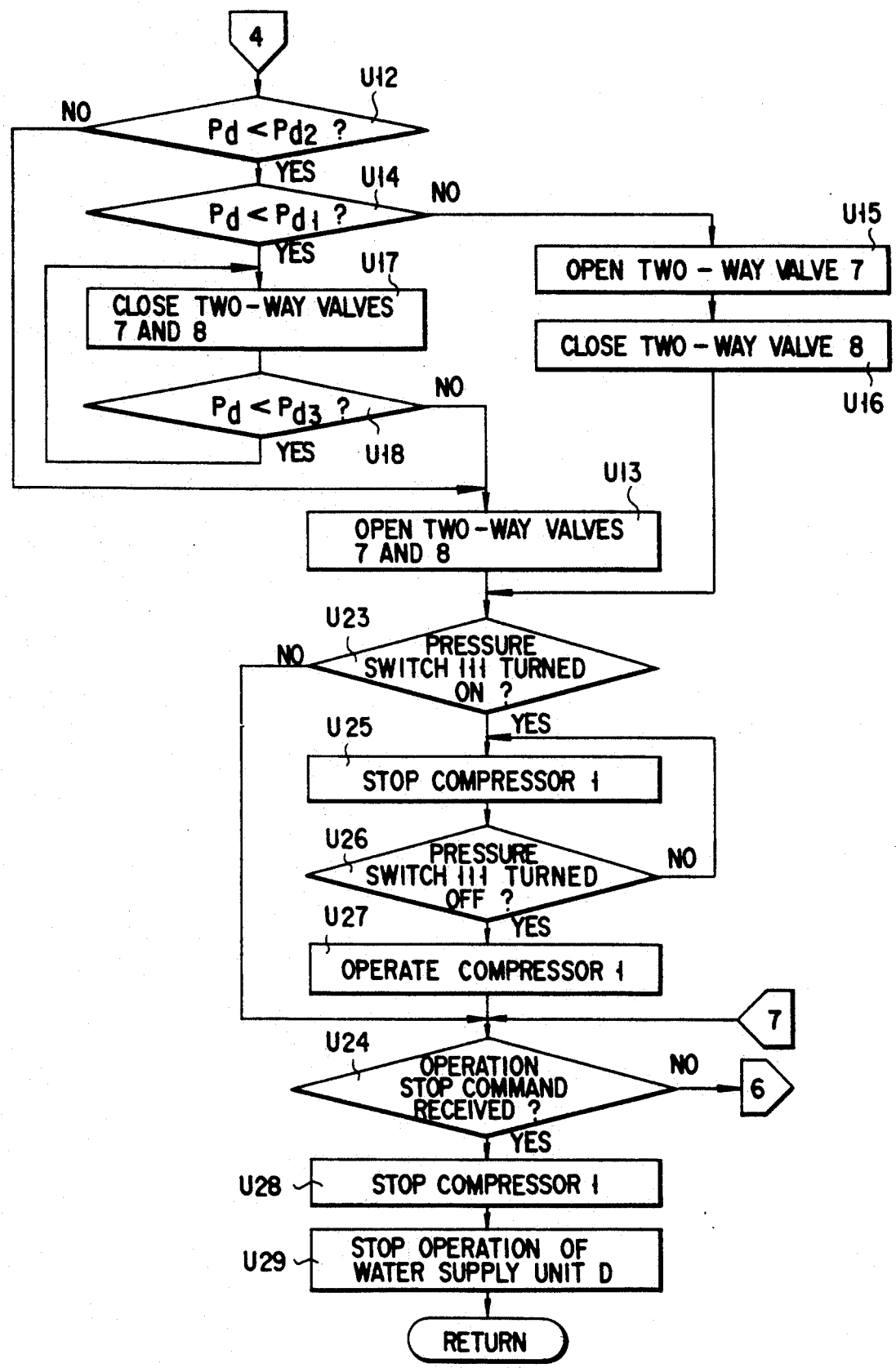
Figure 11:
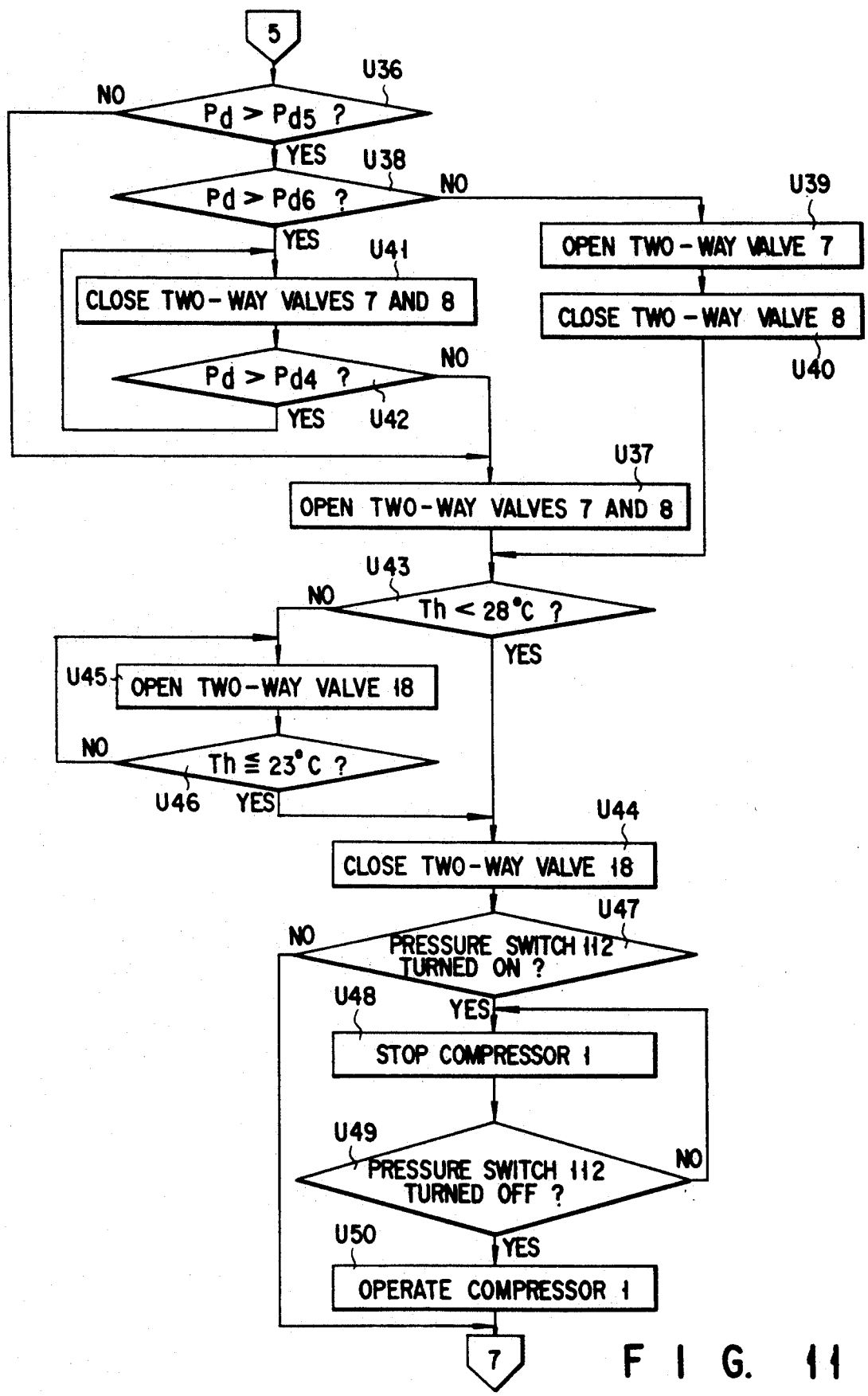

The operation of the outdoor unit A and the water supply unit D will be described with reference to FIGS. 9, 10, and 11.

When the operation start command is supplied from the distribution unit B (Y in step U1), the inverter 51 is driven to start operation of the compressor 1 (step U2).

When the cooling operation mode request is present (Y in step U3), the four-way valve 2 is set in the neutral state (step U4). At this time, since the relay 55 is deenergized, the pressure switch 111 (preset value $P_{si}$) having a lower ON point is selected from the pressure switches 111 and 112 and connected to the terminals 502a and 502b of the circuit board 500 (step U5).

At the same time, the water cooler 83 of the water supply unit D is operated (step U6), the three-way valves 85 and 86 are set in the neutral state (step U7), and the pump 87 is operated (step U8).

When an operation of the pump 87 is started, cooling water in the water cooler 83 enters the water pipe 81 via one channel of the three-way valve 85. Cooling water in the water pipe 81 enters the water heat exchangers $4_a$, $4_b$, and $4_c$. Cooling water then passes through the water pipe 82 and returns to the water cooler 83 via one channel of the three-way valve 86.

In this case, the refrigerant gas is discharged from the compressor 1 and enters the water heat exchanger unit 3 via the four-way valve 2, as indicated by a solid arrow in FIG. 1. The refrigerant gas in the water heat exchanger unit 3 enters the water heat exchangers $4_a$, $4_b$, and $4_c$, is deprived of heat by cooling water supplied from the water supply unit D, and is liquefied.

The liquefied refrigerant then passes through the check valve 9, the receiver 10, and the header 11 and enters the liquid-side pipe W. The liquefied refrigerant in the liquid-side pipe W passes through open ones of the PMVs 21, 31, and 41.

Assume that the PMVs 21 and 31 are open and that the PMV 41 is fully closed.

The liquefied refrigerant entering the PMVs 21 and 31 is pressure-reduced by the expansion valves 22 and 32 and enters the air heat exchangers 24 and 34.

The liquefied refrigerant entering the air heat exchangers 24 and 34 deprives heat from the indoor air and is gasified. The refrigerant gas then enters the gas-side pipe G and is taken in by the compressor 1 via the header 13, the four-way valve 2, and the accumulator 14.

More specifically, the water heat exchanger unit 3 serves as a condenser, and the air heat exchangers 24 and 34 serve as evaporators, thus executing the cooling operation mode by the indoor units $C_1$ and $C_2$.

In the cooling operation mode, counting of time $t_1$ by a timer 51 is started (step U9). The time count $t_1$ is compared with a preset value $t_a$ (step U10).

Before the time count $t_1$ reaches the preset value $t_a$, the frequency F (Hz) of the output voltage of the inverter 52 is set in accordance with the sum of the air conditioning loads (step U11). That is, a capability corresponding to the sum of the air conditioning loads is generated by the compressor 1.

In the cooling operation mode, the high-pressure-side pressure $P_d$ detected by the pressure sensor 110 and a preset value $P_{d2}$ are compared (step U12).

If the number of operating units of the indoor units $C_1$, $C_2$, and $C_3$ is two or more, the high-pressure-side pressure Pd is higher than the preset value $P_{d2}$ ($P_d > P_{d2}$) (N in step U12). In this case, both the two-way valves 7 and 8 are opened (step U13).

When the two way valves 7 and 8 are open, the refrigerant passes through all of the water heat exchangers $4_a$, $4_b$, and $4_c$, and the condensing capability of the water heat exchanger unit 3 becomes maximum.

When the operation mode is switched to the single operation by any one of the indoor units $C_1$, $C_2$, and $C_3$, the condensing capability of the water heat exchanger unit 3 becomes excessive, and the high-pressure-side pressure $P_d$ is decreased.

When the high-pressure-side pressure Pd becomes lower than the preset value $P_{d2}$ ($P_d < P_{d2}$) (Y in step U12), the high-pressure-side pressure Pd is compared with a preset value $P_{d1}$ ($<P_{d2}$) (step U14).

If the high-pressure-side pressure $P_d$ is higher than the preset value $P_{d1}$ ($P_{d2} > P_d > P_{d1}$) (N in step U14), the two-way valve 7 is kept open (step U15), and the two-way valve 8 is closed (step U16).

When the two-way valve 7 is open and the two-way valve 8 is closed, the refrigerant enters the two water heat exchangers $4_a$ and $4_b$ but not the water heat exchanger $4_c$. Namely, the condensing capability of the water heat exchanger unit 3 becomes intermediate.

When the high-pressure-side pressure $P_d$ is further decreased and becomes lower than the preset value $P_{d1}$ ($P_d < P_{d1}$) (Y in step U14), both the two-way valves 7 and 8 are closed (step U17).

When the two-way valves 7 and 8 are closed, the refrigerant enters the water heat exchanger $4_a$ but not the water heat exchangers $4_b$ and $4_c$. Namely, the condensing capability of the water heat exchanger unit 3 becomes minimum.

At this time, the high-pressure-side pressure $P_d$ and a preset value $P_{d3}$ ($>P_{d2}$) are compared (step U18).

If the high-pressure-side pressure $P_d$ is lower than the preset value $P_{d3}$ ($P_d < P_{d3}$) (Y in step U18), the closing state of the two-way valves 7 and 8 continues (step U17).

When the number of operating ones of the indoor units $C_1$, $C_2$, and $C_3$ is increased, the condensing capability of the water heat exchanger unit 3 becomes insufficient, and the high-pressure-side pressure $P_d$ is increased.

When the high-pressure-side pressure $P_d$ exceeds the preset value $P_{d3}$ ($P_d > P_{d3}$) (N in step U18), both the two-way valves 7 and 8 are opened (step U13).

In this manner, when the water heat exchangers $4_a$, $4_b$, and $4_c$ are selectively operated, an excessive increase in condensing capability is suppressed, and the high-pressure-side pressure $P_d$ is not excessively decreased but maintained at a necessary and sufficient value.

In the cooling operation mode, when the time count $t_1$ reaches the preset value $t_a$ (Y in step U10), the frequency F (Hz) of the output voltage of the inverter 52 is increased to a preset value $F_a$ (step U19). Then, the capability of the compressor 1 is increased, and the circulating amount of refrigerant is increased.

When the circulating amount of refrigerant is increased, the lubricant 103 flowing through the refrigeration cycle is efficiently recovered by the compressor 1.

To recover the lubricant 103, a time count $t_2$ is counted by the timer 51 (step S20), and the time count $t_2$ is compared with a preset value $t_b$ (step U21).

Until the time count $t_2$ reaches the preset value $t_b$ (N in step U21), recovery of the lubricant continues.

When the time count $t_2$ reaches the preset value $t_b$ (Y in step U21), the time counts $t_1$ and $t_2$ are cleared (step U22). At the same time, recovery of the lubricant is completed.

In the cooling operation mode, the pressure switch 111 (preset value $P_{s1}$) having a lower ON point is selected, as described above, and the state of the pressure switch 111 is monitored (step U23).

If the pressure switch 111 is not turned on and the operation stop command is not supplied from the distribution unit B (N in step U24), the flow returns to step U3 to continue the cooling operation mode.

If the low-pressure-side pressure $P_s$ is decreased to the preset value $P_{s1}$ or less by some reason, the pressure switch 111 is turned on (Y in step U23).

When the pressure switch 111 is turned on, driving of the inverter 52 is stopped, and the operation of the compressor 1 is stopped (step U25). The operation stop continues unless the pressure switch 111 is turned off by a manual operation.

When the pressure switch 111 is turned off (Y in step U26), the operation of the compressor 1 is resumed (step U27).

During recovery of the lubricant, since the flow amount of refrigerant is increased, the vapor pressure of the refrigerant in the air heat exchangers 24, 34, and 44 is decreased. Then, the low-pressure-side pressure $P_s$ is decreased, and the pressure switch 111 might be undesirably turned on to stop the cooling operation.

However, the preset value $P_{s1}$ as the ON point of the pressure switch 111 is small. That is, even if the low-pressure-side pressure $P_s$ is decreased during recovery of the lubricant, it is not decreased down to the preset value $P_{s1}$ as the ON point of the pressure switch 111, as shown in FIG. 12.

Therefore, the pressure switch 111 is not turned on during recovery of the lubricant, and an unnecessary operation stop can be avoided.

When the operation stop command is supplied from the distribution unit B (Y in step U24), the operation of the compressor 1 is stopped (step U28). At the same time, the operation of the water supply unit D is stopped (step U29).

When the heating operation mode request is present (N in step U3), the four-way valve 2 is switched (step U30). At this time, since the relay 55 is energized, the pressure switch 112 (preset value $P_{s2}$) which has a higher ON point is selected from the pressure switches 111 and 112 and connected to the terminals $502_a$ and $502_b$ of the circuit board 500 (step U31).

At the same time, the water heater 84 of the water supply unit D is operated (step U32), the three-way valves 85 and 86 are switched (step U33), and the pump 87 is operated (step U34).

When the operation of the pump 87 is started, hot water in the water heater 84 enters the water pipe 81 via the other channel of the three-way valve 85. Hot water in the water pipe 81 enters the water heat exchangers $4_a$, $4_b$, and $4_c$. Water then passes through the water pipe 82 and returns to the water heater 84 via other channel of the three-way valve 86.

In this case, the refrigerant gas is discharged from the compressor 1, passes through the four-way valve 2 and the header 13, and enters the gas-side pipe G, as indicated by broken arrows in FIG. 1.

Assume that the PMVs 21 and 31 are open and that the PMV 41 is fully closed.

The refrigerant gas in the gas-side pipe G enters the air heat exchangers 24 and 34, is deprived of heat by indoor air, and is liquefied.

After passing through the air heat exchangers 24 and 34, the liquefied refrigerant enters the liquid-side pipe W via the check valves 23 and 33 and the PMVs 21 and 31, respectively. The liquefied refrigerant in the liquid-side pipe W passes through the header 11, the receiver 10, and the expansion valve 12, and enters the water heat exchangers $4_a$, $4_b$, and $4_c$ of the water heat exchanger unit 3.

The refrigerant in the water heat exchangers $4_a$, $4_b$, and $4_c$ deprives hot water supplied from the water supply unit D of heat and is gasified. After passing through the water heat exchangers $4_a$, $4_b$, and $4_c$, the refrigerant gas is taken in by the compressor 1 via the four-way valve 2 and the accumulator 14.

Namely, the air heat exchangers 24 and 34 serve as condensers, and the water heat exchanger unit 3 serves as an evaporator, thereby executing the heating operation by the indoor units $C_1$ and $C_2$.

In the heating operation mode, the frequency F (Hz) of the output voltage of the inverter 52 is set in accordance with the sum of the air conditioning loads (step U35). In other words, a capability corresponding to the sum of the air conditioning loads is generated by the compressor 1.

In the heating operation mode, the high-pressure-side pressure $P_d$ detected by the pressure sensor 110 and a preset value $P_{d5}$ are compared (step U36).

If the number of operating ones of the indoor units $C_1$, $C_2$, and $C_3$ is 2 or more, the high-pressure-side pressure $P_d$ becomes lower than the preset value $P_{d5}$ ($P_d > P_{d5}$) (N in step U36). At this time, both the two-way valves 7 and 8 are opened (step U37).

When the two-way valves 7 and 8 are open, the refrigerant passes through all of the water heat exchangers $4_a$, $4_b$, and $4_c$, and the evaporating capability of the water heat exchanger unit 3 becomes maximum.

When the operation mode is switched to the single operation by any one of the indoor units $C_1$, $C_2$, and $C_3$, the evaporating capability of the water heat exchanger unit 3 becomes excessive, and the high-pressure-side pressure $P_d$ is increased.

When the high-pressure-side pressure $P_d$ becomes higher than the preset value $P_{d5}$ ($P_d > P_{d5}$) (Y in step U36), the high-pressure-side pressure Pd is compared with a preset value $P_{d6}$ ($> P_{d5}$) (step U38).

If the high-pressure-side pressure $P_d$ is lower than the preset value $P_{d6}$ ($P_{d6} > P_d > P_{d5}$) (N in step U38), the two-way valve 7 is kept open (step U39), and the two-way valve 8 is closed (step U40).

When the two-way valve 7 is open and the two-way valve 8 is closed, the refrigerant enters the two water heat exchangers $4_a$ and $4_b$ but not the water heat exchanger $4_c$. Namely, the evaporating capability of the water heat exchanger unit 3 becomes intermediate.

When the high-pressure-side pressure $P_d$ is further increased and becomes higher than the preset value $P_{d6}$ ($P_d > P_{d6}$) (Y in step U38), both the two-way valves 7 and 8 are closed (step U41).

When the two-way valves 7 and 8 are closed, the refrigerant enters the water heat exchanger $4_a$ but not the water heat exchangers $4_b$ and $4_c$. Namely, the evaporating capability of the water heat exchanger unit becomes minimum.

At this time, the high-pressure-side pressure $P_d$ and a preset value $P_{d4}$ ($< P_{d5}$) are compared (step U42). Note that $P_{d4} > P_{d3}$.

If the high-pressure-side pressure $P_d$ is higher than the preset value $P_{d4}$ ($P_d > P_{d4}$) (Y in step U42), the closing state of the two-way valves 7 and 8 continues (step U41).

When the number of operating ones of the indoor units $C_1$, $C_2$, and $C_3$ is increased, the evaporating capability of the water heat exchanger unit 3 becomes insufficient, and the high-pressure-side pressure $P_d$ is decreased.

When the high-pressure-side pressure $P_d$ becomes lower than the preset value $P_{d4}$ ($P_d < P_{d4}$) (N in step U42), both the two-way valves 7 and 8 are opened (step U37).

In this manner, when the water heat exchangers $4_a$, $4_b$, and $4_c$ are selectively operated, an excessive increase in evaporating capability is suppressed, and an abnormal increase in high-pressure-side pressure $P_d$ is prevented.

Figure 13:
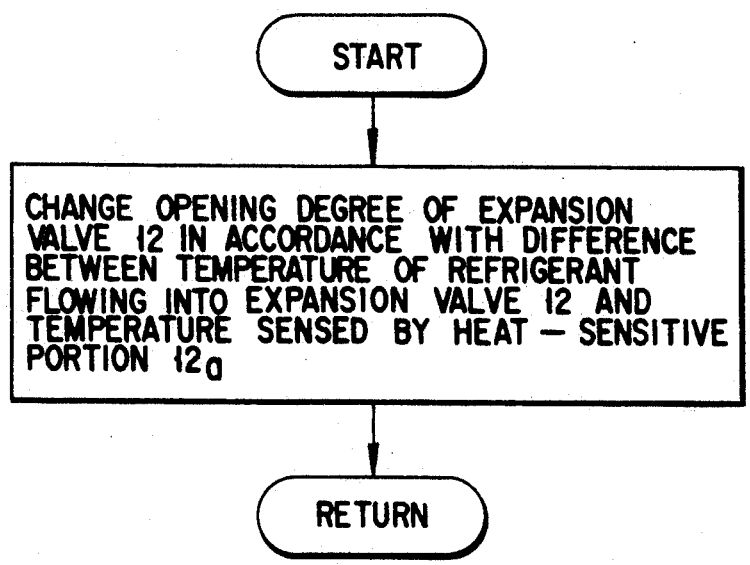
FIG. 13 is a flow chart for explaining the operation of an expansion valve of the embodiment shown in FIG. 1.

In the heating operation mode, the opening degree of the expansion valve 12 as a standard thermostatic expansion valve operating to maintain a constant superheat is changed in accordance with a difference between the temperature of the refrigerant flowing into the expansion valve 12 (i.e., the temperature of the refrigerant flowing into the water heat exchanger unit 3) and the temperature sensed by the heat-sensitive portion $12a$, as indicated in FIG. 13. The amount of refrigerant flowing into the water heat exchanger unit 3 is controlled by changing the opening degree of the expansion valve 12, so that the super-heat degree of the refrigerant in the water heat exchanger unit 3 is maintained at a predetermined value.

The temperature of hot water supplied from the water supply unit D to the water heat exchanger unit 3 is sometimes increased due to the influence of a change in outer temperature. In this case, the temperature of the refrigerant flowing from the water heat exchanger unit 3 is increased.

When the temperature of the refrigerant flowing from the water heat exchanger unit 3 is increased, the temperature sensed by the heat-sensitive portion $12a$ of the expansion valve 12 is increased, and the opening degree of the expansion valve 12 is changed in the increasing direction by an amount corresponding to the increase in temperature sensed by the heat-sensitive portion $12a$.

Then, the circulating amount of refrigerant is increased to increase the low-pressure-side pressure $P_s$, and the high-pressure side pressure $P_d$ is also increased because of the influence of the low-pressure-side pressure $P_s$.

In order to prevent this, in the heating operation mode, the temperature of water flowing from the water heat exchanger unit 3, i.e., the temperature Th of water after heat exchange by the water heat exchanger unit 3 is detected by the temperature sensor 113. The detected temperature Th is compared with a preset value 28° C. (step U43).

Figure 14:
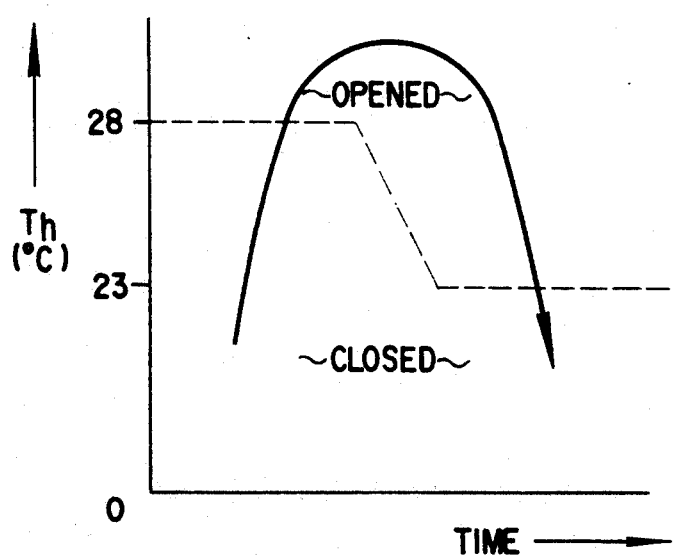
FIG. 14 is a graph showing a relationship between a detection temperature detected by a temperature sensor and open/close control of a two-way valve of the embodiment shown in FIG. 1.

If the temperature of hot water supplied to the water heat exchanger unit 3 is of a normal value, the detected temperature Th from the temperature sensor 113 becomes less than the preset value of 28° C. (Y in step U43). In this case, as shown in FIG. 14, the two-way valve 18 is closed (step U44), and the bypass 17 is kept disconnected.

If the temperature of hot water supplied to the water heat exchanger unit 3 becomes higher than the normal value, the detection temperature Th of the temperature sensor 113 exceeds the preset value of 28° C. (N in step U43). In this case, as shown in FIG. 14, the two-way valve 18 is opened (step U45), and the bypass 17 is caused to communicate with the four-way valve 2.

When the bypass 17 communicates with the four-way valve 2, part of the low-temperature refrigerant passing through the indoor units $C_1$, $C_2$, and $C_3$ flows into the four-way valve 2 via the bypass 17. The low-temperature refrigerant passes through the four-way valve 2 and enters a pipe in which the heat-sensitive portion 12a of the expansion valve 12 is mounted.

The heat-sensitive portion 12a of the expansion valve 12 is thus cooled, and an unnecessary increase in temperature sensed by the heat-sensitive portion 12a is prevented. Namely, an unnecessary increase in opening degree of the expansion valve 12 is prevented.

Thus, an unnecessary increase in circulating amount of refrigerant can be prevented, and an increase in low-pressure-side pressure Ps can be prevented. As a result, an increase in high-pressure-side pressure $P_d$ can be prevented, so that the lifetime of the components constituting the refrigeration cycle is not adversely affected.

When the temperature of hot water supplied to the water heat exchanger unit 3 is decreased and the detection temperature Th of the temperature sensor 113 becomes equal to or less than a preset value of 23° C. (Y in step U46), the two-way valve 18 is closed (step U44), and the bypass 17 is disconnected from the four-way valve 2.

In the heating operation mode, the pressure switch 112 (preset value $P_{s2}$) having the higher ON point is selected, as described above, and its state is monitored (step U47).

If the pressure switch 112 is not turned on (N in step U47) and the operation stop command is not supplied from the distribution unit B (N in step U24), the flow returns to step U3 and the heating operation mode continues.

If the low-pressure-side pressure $P_s$ is decreased to less than the preset value $P_{s2}$ for some reason, the pressure switch 112 is turned on (Y in step U47).

When the pressure switch 112 is turned on, driving of the inverter 52 is stopped, and the operation of the compressor 1 is stopped (step U48). This operation stop continues unless the pressure switch 112 is turned off by a manual operation.

When the pressure switch 112 is turned off (Y in step U49), the operation of the compressor 1 is resumed (step U50).

In the heating operation mode, the surfaces of the water heat exchangers $4_a$, $4_b$, and $4_c$ serving as evaporators are gradually frosted. When the amount of frost is increased, the water heat exchangers $4_a$, $4_b$, and $4_c$ are frozen and may be damaged.

However, the pressure switch 112 (preset value $P_{s2}$) having the higher ON point is selected. In addition, when the amount of frost attaching to the water heat exchangers $4_a$, $4_b$, and $4_c$ is increased, the evaporating pressure of the refrigerant in them is decreased, and the low-pressure-side pressure $P_s$ is decreased.

Accordingly, the low-pressure-side pressure $P_s$ becomes lower than the preset value $P_{s2}$ before the water heat exchangers $4_a$, $4_b$, and $4_c$ are frozen, and the pressure switch 112 is turned on.

When the pressure switch 112 is turned on, the operation of the compressor 1 is stopped, and freezing of and hence damage to the water heat exchangers $4_a$, $4_b$, and $4_c$ are prevented.

In the above embodiment, the flow of refrigerant to the water heat exchangers $4_a$, $4_b$, and $4_c$ is controlled by the two two-way valves 7 and 8. However, the number of two-way valves is not limited to two, and it is sufficient if at least one two-way valve is provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An air conditioning apparatus in which one outdoor unit is connected to one or a plurality of indoor units, comprising:

a compressor, provided to said outdoor unit, for taking in, compressing, and discharging a refrigerant;

a water heat exchanger unit, provided to said outdoor unit, for exchanging heat of the refrigerant flowing therein for heat of water supplied thereto;

a water supply unit for supplying water to said water heat exchanger unit;

a thermostatic expansion valve, provided to said outdoor unit and having a heat-sensitive portion for sensing a temperature of the refrigerant flowing in said compressor, for maintaining at a predetermined value a super-heat degree of the refrigerant in said water heat exchanger unit by changing an opening degree thereof in accordance with the temperature sensed by said heat-sensitive portion;

one or a plurality of air heat exchangers, provided to said one or plurality of indoor units, for exchanging heat of the refrigerant flowing therein for heat of indoor air;

means for flowing the refrigerant discharged from said compressor to said one or plurality of air heat exchangers, flowing the refrigerant passing through said one or plurality of air heat exchangers to said water heat exchanger unit via said expansion valve, and returning the refrigerant passing through said water heat exchanger unit to said compressor, thereby executing a heating operation mode;

a bypass for supplying part of the refrigerant passing through said one or plurality of air heat exchangers to a suction side of said compressor;

a two-way valve provided to said bypass;

detecting means for detecting a temperature of water after heat-exchanged by said water heat exchanger unit; and control means for opening said two-way valve when the temperature detected by said detecting means is not less than a preset value in the heating operation mode.

2. An apparatus according to claim 1, wherein said water heat exchanger unit has a plurality of water heat exchangers.

3. An apparatus according to claim 2, wherein said water heat exchangers are of a double pipe type in which inner and outer pipes are coaxially arranged, water flows in said inner pipe, and the refrigerant flows between said inner and outer pipes.

4. An apparatus according to claim 2, further comprising:

at least one two-way valve for controlling flows of the refrigerant into said water heat exchangers;

a pressure sensor for detecting a pressure of the refrigerant discharged from said compressor; and control means for controlling opening/closing of said at least one two-way valve in accordance with a pressure detected by said pressure sensor.

5. An apparatus according to claim 1, wherein said water supply unit has a water cooler for supplying cold water and a water heater for supplying hot water.

6. An apparatus according to claim 5, further comprising:

means for flowing the refrigerant discharged from said compressor to said water heat exchanger unit, flowing the refrigerant passing through said water heat exchanger unit to said one or plurality of air heat exchangers, and returning the refrigerant passing through said one or plurality of air heat exchangers to said compressor, thereby excuting a cooling operation mode; and control means for operating said water cooler in the cooling operation mode and said water heater in the heating operation mode.

* * * * *